May 10, 1966     W. L. BLOOM     3,250,270
DEVICE AND METHOD FOR MEASURING THE
CALORIES AN INDIVIDUAL EXPENDS

Filed Sept. 19, 1962     2 Sheets-Sheet 1

INVENTOR.
Walter Lyon Bloom
BY
ATTORNEY

May 10, 1966

W. L. BLOOM 3,250,270

DEVICE AND METHOD FOR MEASURING THE
CALORIES AN INDIVIDUAL EXPENDS

Filed Sept. 19, 1962

INVENTOR.
Walter Lyon Bloom

BY

ATTORNEY

United States Patent Office 3,250,270
Patented May 10, 1966

3,250,270
DEVICE AND METHOD FOR MEASURING THE CALORIES AN INDIVIDUAL EXPENDS
Walter Lyon Bloom, Bloomland Farm, Rte. 3, Marietta, Ga.
Filed Sept. 19, 1962, Ser. No. 224,761
5 Claims. (Cl. 128—2.07)

This invention relates to a device and method for measuring the amount of calories an individual expends or utilizes in a given period of time. Such a device can be most useful to individuals confronted with weight problems since it clearly illustrates the amount of time that is required to consume a given amount of energy. With this concept in mind, individuals would be more mindful to adjust their caloric intake so that either obesity or underweight can be overcome.

Exhaustive medical experimentation, that is the basis for the present invention, with normal individuals as well as those confronted with obesity has revealed that there is a direct relationship between the amount of calories expended and the volume of gas one exhales. Therefore, by determining the volume of exhalation in a given unit of time, the amount of calories expended in that time can be directly ascertained.

In the past, metabolism studies have required elaborate equipment and trained technicians to conduct the analyses. The patient was required to go to a hospital or doctor's office that had such facilities available and was usually tested in a situation unlike his daily routine. These prior art studies entailed precise determination of the amount of pure oxygen consumed by an individual and the amount of $CO_2$ gas that was expelled by exhalation, to determine the caloric expenditure. It is readily seen that the method of the present invention overcomes these tedious and exacting requirements.

The present invention in addition to providing an easy and correct method of measuring the number of calories that are expended by individuals, would also find application in the measurement of physical fitness, in the measurement of muscular efficiency at specific tasks, and in the measurement of pulmonary function.

The present method and device, which will be referred to hereafter as a calorie-meter, measures the number of calories used per minute under varying conditions of energy expenditure, e.g., walking, sitting, lying in bed. Each person has an individual energy consumption rate, depending upon age, sex, weight and physical conditions. Thus, it is possible for each person by the simple means of the calorie-meter to measure and predict the energy spent during a day of normal routine. Knowing the daily energy expenditure, it is possible to determine the amount of food which should be eaten to lose, gain or maintain body weight. This is most important for the obese or overweight person for weight control as it makes it possible to know how much to eat in order to lose weight.

The calorie-meter may be used for calculating total energy expenditure per day. For example, the energy output upon arising times the hours in bed will provide the basal energy expenditure. Several measurements during the day's activities (sitting at desk, walking a usual pace, etc.) provide the energy used during the times of these activities. For example:

| | Calories |
|---|---|
| In bed, 8 hours at 1 cal./min.[1] | 480 |
| Sitting activities, 8 hours at 1.2 cal./min.[1] | 576 |
| Walking activities, 8 hours at 2 cal./min.[1] | 960 |
| Total daily energy expenditure | 2016 |

[1] Calorie-meter reading.

*Example of food-energy balance*

| | |
|---|---|
| Food intake | 1116 |
| Energy output cal. | 2016 |
| Body calories used | 900 |
| Weight loss lb./day | ¼ |

If 1800 body calories are used per day then the weight loss is ½ pound per day based on 3600 calories expended is equal to one pound of body fat.

The present device for the first time affords the public the opportunity of relating their food intake to the calories they use. Any excess food intake above the energy used leads to weight gain, any decrease of food intake below daily energy requirement leads to weight loss. Never, before has an individual had such a simple device to help him regulate the food-energy balance of the body.

The calorie-meter of the present invention also provides an individual with a simple method of measuring a number of personal functions:

(a) *Physical fitness.*—The amount of energy (number of calories per minute) that a person uses doing a given task (walking 2 m.p.h.) is a measure of the physical fitness. An athlete performs a given activity at lower energy expenditure than an unfit person. If the rate of activity, such as walking is increased to 3 or 4 m.p.h., more calories are consumed, but the rate of caloric energy expenditure is much greater in the unfit person than in the physically fit. This fact can be used for the study of the fitness of a group doing a given task. For example, using this device the fitness of school children may be evaluated on a simple but scientific basis.

(b) *Physical conditioning* can be demonstrated by means of repeated measurements of energy expenditure at a given task (walking 2 m.p.h.). It is possible to show that as the muscles are trained by repeated exercise and become conditioned, less energy is used to do the same task. This is particularly important in the field of athletics and military training where conditioning is an important part of preparation. A coach or trainer can measure the progress of an athlete or trainee and show him by actual measurement the rate and degree of muscle conditioning and training and the increase in physical or muscle efficiency during training. In school programs actual measurements during the multiple test procedures can add much information about the physical state of a child and the improvement in his physical condition during the physical education program.

(c) *Evaluation of fitness for job performance.*— Measurements of a person's energy output during occupational testing, where physical activity is employed, will indicate the efficiency of performance. A person using many calories for job performance is inefficient and will need training.

(d) *Individual physical efficiency* can be determined by the measurement of caloric expenditure during the performance at varying rates of a given task. Higher efficiency is indicated by a relatively constant rate of caloric expenditure during the whole performance, whereas a low efficiency would show an increase of rate with time.

(e) *Means for comparing one person's efficiency with another under the same conditions.*—The calorie-meter and associated method provide means for comparing individual effort efficiencies within a group.

(f) *Measurement of physical fatigue.*—When more and more calories are required to continue a specific task, e.g., walking up stairs, at a fixed rate, the body is not functioning efficiently and will soon reach a limit of energy production and become fatigued. Thus an increasing energy expenditure at a given task anticipates fatigue.

(g) *Determination of emotional fatigue.*—The measurement of caloric energy expenditure makes it possible to separate emotional fatigue from physical fatigue. A person burning few calories but feeling tired has emotional fatigue.

(h) *Medical application.*—The calorie-meter may be used to relate a person's physical activities to their functional capacity. For example, a patient with heart disease may have a marked functional limitation. Measurement of the caloric consumption that he can tolerate provides a measurement of his capacity and establishes a yardstick for following the progress of the disease. Similar examples may be found in many other types of disease.

(i) *Experimental application.*—The calorie-meter provides a simple means of repeated determination of energy output and respiratory gas exchange in both experimental animals as well as man.

These and other features of the present invention are described in further detail below in connection with the accompanying drawings, in which.

The invention is based on the observation of a great number of individuals and the determination of the various levels of metabolism occurring during various levels of energy expenditure (activity). The total expired air was collected and analyzed utilizing the Scholander-Roughton method and apparatus in which the oxygen consumption, carbon dioxide output, and respiratory quotient are used to determine the calories consumed per minute. The collected data established a highly significant linear correlation between expired respiratory volume and calories consumed per minute. The linear regression of the data was calculated and indicated that the correlation factor of .207±.005 calorie per liter of expired air per minute was applicable between the rate of 4 to 50 liters per minute.

Figure 6:
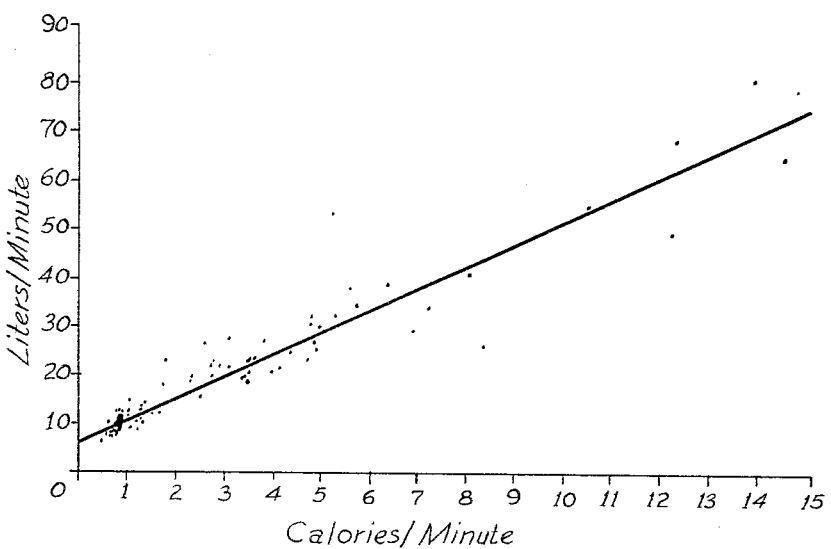

The following data is the basis for FIG. 6:

| Number of Determination | Liters of Respired Air Corrected to Standard Atmospheric Conditions | Energy Consumption in Calories per Minute |
|---|---|---|
| | 6.7 | .79 |
| | 9.6 | 1.02 |
| | 5.3 | .58 |
| | 6.1 | .74 |
| | 8.8 | .93 |
| | 8.2 | 1.11 |
| | 7.4 | 1.0 |
| | 6.5 | .9 |
| | 6.7 | .9 |
| 10 | 7.4 | .97 |
| | 8.9 | 1.21 |
| | 6.8 | .98 |
| | 6.2 | .80 |
| | 6.7 | .97 |
| | 8.5 | .74 |
| | 7.1 | .76 |
| | 6.2 | .94 |
| | 7.2 | .85 |
| | 6.3 | .86 |
| 20 | 6.6 | .89 |
| | 5.6 | .80 |
| | 8.6 | .91 |
| | 8.2 | 1.04 |
| | 7.9 | 1.0 |
| | 5.8 | .85 |
| | 9.7 | 1.58 |
| | 10.2 | 1.37 |
| | 11.0 | 1.18 |
| | 9.6 | 1.0 |
| 30 | 15.0 | 1.54 |
| | 11.1 | 1.12 |
| | 8.5 | 1.43 |
| | 10.9 | 1.0 |
| | 8.2 | .92 |
| | 9.6 | 1.43 |
| | 9.7 | 1.08 |
| | 9.2 | 1.09 |
| | 9.3 | 1.12 |
| | 8.3 | 1.02 |
| 40 | 12.5 | 2.25 |
| | 25.3 | 4.7 |
| | 28.6 | 3.56 |
| | 21.8 | 3.56 |
| | 19.7 | 3.84 |
| | 29.0 | 5.2 |
| | 15.2 | 2.82 |
| | 9.6 | 1.04 |
| | 23.1 | 3.97 |
| | 21.7 | 3.35 |
| 50 | 27.6 | 4.24 |
| | 31.6 | 5.47 |
| | 12.5 | 1.52 |
| | 17.2 | 2.11 |
| | 10.3 | 1.52 |
| | 12.0 | 1.53 |
| | 20.1 | 3.95 |
| | 21.9 | 3.06 |
| | 14.0 | 1.87 |
| | 36.9 | 5.6 |
| 60 | 22.5 | 2.1 |
| | 12.6 | 2.11 |
| | 12.7 | 1.8 |
| | 62.0 | 14.5 |
| | 46.4 | 12.4 |
| | 21.8 | 4.5 |
| | 21.3 | 4.4 |
| | 77.8 | 13.6 |
| | 85.2 | 16.3 |
| | 23.5 | 5.0 |
| 70 | 25.3 | 5.2 |
| | 18.7 | 4.0 |
| | 31.7 | 5.0 |
| | 30.4 | 5.0 |
| | 27.1 | 6.7 |
| | 65.5 | 11.9 |
| | 54.0 | 10.7 |
| | 23.0 | 4.0 |
| | 37.0 | 6.3 |
| | 32.8 | 5.8 |
| 80 | 13.7 | 1.8 |
| | 20.8 | 3.1 |
| | 23.2 | 4.1 |
| | 20.7 | 4.0 |
| | 19.5 | 3.1 |
| | 18.6 | 2.6 |
| | 32.9 | 7.1 |
| | 38.2 | 7.8 |
| | 26.6 | 5.1 |
| | 22.7 | 3.1 |
| 90 | 18.1 | 2.6 |

Using the above data a scattergram was plotted as is shown here in FIG. 6. The slope line of the data was statistically computed and is shown on the graph.

To test the significance of the regression coefficient a "$t$" test (standard statistical test) was used.

The following symbols and their equivalents are set forth below as well as the calculation involved. It is significant to note that the probability is substantially less than .001 as a "$t$" number of 3.402 is required for a probability of .001 and the "$t$" number obtained in these calculations is 41.4:

$\overline{Y}$=Means corrected liters of expired air per minute from determinations covering a wide range of physical activity.

$\overline{X}$=Mean calories per minute of energy output from 90 determinations covering a wide range of physical activity from rest (basal) to strenuous exercise.

Sum of X=Sum of calories for all determinations.

Sum of Y=Sum of all determinations of corrected expired air in liters per minute.

Sum of XY=Sum of liters of corrected air per minute times the calories per minute for each determination.

Sum $x^2$=Sum of squares of X deviations from the mean ($\overline{X}$).

Sum $y^2$=Sum of squares of Y deviations from the mean ($\overline{Y}$).

Sum $xy$=Sum of the products of X and Y deviations from their mean.

Sum $dyx^2$=Sum of the squares of the deviations.

$Syx^2$=Mean square deviation from regression.

$Syx$=Sample standard deviation of the regression coefficient.

$Sb$=Sample standard deviation of the regression coefficient.

$t$="$t$" test of significance.

$n$=Number of determinations.

$$\begin{array}{ll} \text{Sum } Y = 290.29 & \text{Sum } X = 1726.50 \\ \overline{Y} = 3.23 & \overline{X} = 19.18 \end{array}$$

$$\text{Sum } XY = 9928.14$$
$$(\text{Sum } X)(\text{Sum } Y) = 5568.73$$
$$\text{Sum } xy = 4359.41$$

$$\begin{array}{ll} \text{Sum } Y^2 = 1881.55 & \text{Sum } X^2 = 54{,}166.43 \\ (\text{Sum } Y)^2/n = 936.31 & (\text{Sum } X)^2/n = 33{,}120.03 \\ \text{Sum } y^2 = 945.24 & \text{Sum } x^2 = 21{,}046.4 \end{array}$$

Sum $dyx^2$=Sum $y^2 -$ (Sum $xy$)$^2$/Sum $x^2 = 46.43$ $Syx^2$=Sum $dyx^2/n-2=.527$ $sb^2 = Syx^2/\text{Sum } x^2 = .000025$ $sb = .005$ $b$=sample regression coefficient or the units of calories per liter of expired air per minute.

$$b = \text{Sum } xy/\text{Sum } x^2 = \frac{4359.41}{21{,}046.40} = .207$$

$$T = b/sb = \frac{.207}{.005} = 41.40$$

Probability $<.001$

The statistical analysis shows the validity of my formula relative to the calories of energy output to the expired air per minute.

*Formula*

Calories per minute=K times liters of expired air per minute.

$$K^1 = \text{constant } .207 \pm .005$$

Therefore, one liter of expired air indicated the consumption of .207 calorie.

Since it would require quite cumbersome equipment to collect the entire volume of gas exhaled in breathing over a given time, several means have been devised to take advantage of the relationship to provide handy, portable devices which will give the same results.

One solution is to meter the exhaled gas volumetrically and then register the volume on a dial. Another solution is to make use of pressure rather than volume.

Considering an individual's throat as an orifice of constant cross section, the volume of respired air is a function of average pressure. It is understood that respired air is a measure of respiratory volume, e.g., the amount of air inhaled or exhaled.

Figure 1:
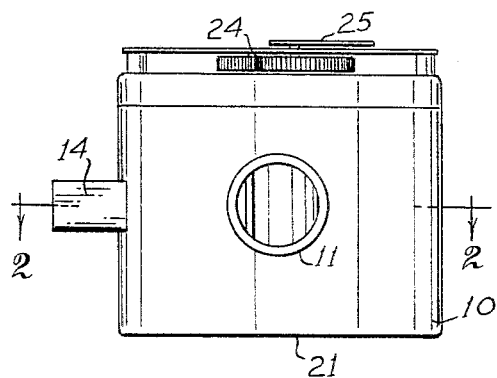
FIG. 1 is a front elevational view of a volumetric measuring device which may be used for the method of the present invention.

Referring now particularly to the drawings and to those embodiments here chosen by way of illustration, it will be seen that the device of FIG. 1 shows a volumetric measuring means. The device is formed as a sliding vane gas motor having dial means to indicate volume.

Figure 2:
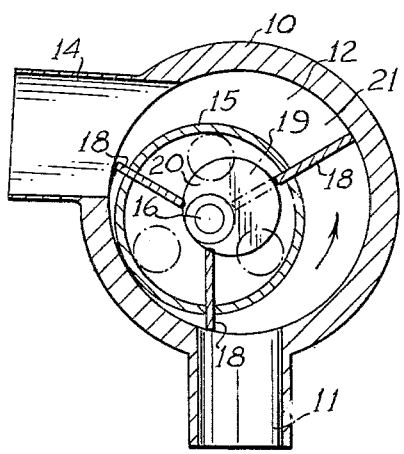
FIG. 2 is a cross sectional view taken substantially along line 2—2 of FIG. 1.

The device of FIGS. 1 and 2 includes a cylindrical housing 10 having a gas inlet nipple 11 which extends radially from the housing 10 and communicates with the central cavity 12 in the housing 10. A gas outlet 14 is provided substantially tangential to the central cavity 12, and is arranged well around the housing 10 in the direction of rotation of the rotor 15 as will be explained later.

Within the cavity 12 of the body 10 there is a cylindrical rotor 15 which is eccentrically mounted for rotation at 16. Around the periphery of the rotor 15 there is a plurality of slots which slidably receive vanes 18, here shown as three vanes. The central hub of the rotor 15 is connected to the cylindrical periphery by a web indicated by the broken lines at 19. The web 19 is also properly slotted to receive the vanes 18.

The general structure of such a sliding vane gas motor is well known in the art, and should be easily understood from the foregoing description. Most sliding vane devices used heretofore have depended upon centrifugal force to move the vanes outwardly, while the housing wall will force the vanes inwardly. In the present device, however, the angular velocity is low and the vanes 18 would not be forced outwardly by centrifugal force alone, therefore, a cam 20 is provided. The cam 20 is attached to or formed integrally with the bottom wall 21 of the housing 10, and is so designed and positioned that the distance between the outer periphery of the cam and the inner periphery of the cavity is always equal to the width of the vanes. It will thus be seen that the vanes 18 will always be in contact with the wall of the cavity 12.

The important consideration in the design of the device is to assure that a positive volume is measured; therefore, the positioning of the vanes 18 and the gas outlet 14 should be such that a volume of gas is trapped between two vanes and the housing wall at some time. Otherwise, gas may pass directly through the device and not register on the dial.

The dial for the device is run by an extension of the pivotal mounting 16 of the rotor 15. The gears indicated at 24 may be designed so that the hand 25 will move a given increment with each revolution of the rotor 15. Since volume is a function of calories expended, the dial may be calibrated in calories rather than in volume for direct reading.

The caloric consumption measuring device may include a timer which can be set for varied time determinations or continuous timing if desired so that the caloric consumption measured may be calibrated in relation to the time involved.

Figure 3:
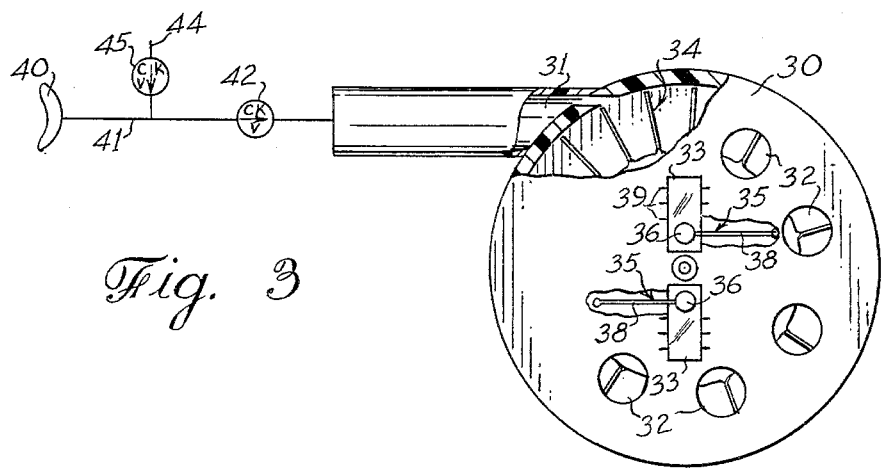
FIG. 3 is a front elevational view, partially broken away, of a device which operates on pressure for carrying out the method of the present invention with the gas control means being shown schematically.

The device shown in FIG. 3 operates on the principle that with an orifice of constant cross section the average pressure over a given period of time is a function of volume. The device is simply an air turbine having a housing 30 and a tangential air inlet 31 with air outlets 32 in the side of the housing. The rotor 34 has attached to one side a pair of indicators 35. The indicators 35 comprise weights 36 carried by spring arms 38, the arms 38 being rigidly fixed to the side of the rotor 34. Thus, as the rotor 34 spins, centrifugal force will cause the weights 36 to move outwardly flexing the arms 38. The amount of movement will be a measure of the speed of the rotor. The side of the housing 30 has a transparent opening 33 so that the position of the indicators 35 can be seen, and indices 39 are printed, painted or otherwise made on the housing 30 adjacent said opening 33 and calibrated appropriately to read the rate of calories expended in accordance with the above stated relationship.

When in use the device may employ a face mask or mouth piece with nose clamp shown schematically at 40. The mask 40 has a tube 41 leading to the air inlet 31, the tube 41 including a check valve 42 to assure that air will travel in only one direction, i.e., to assure that air will enter the inlet 31. To allow the person to inhale a branch tube 44 is provided with a check valve 45 to prevent the escape of exhaled air. An arrangement similar to this may be used with all of the embodiments herein shown.

Figure 4:
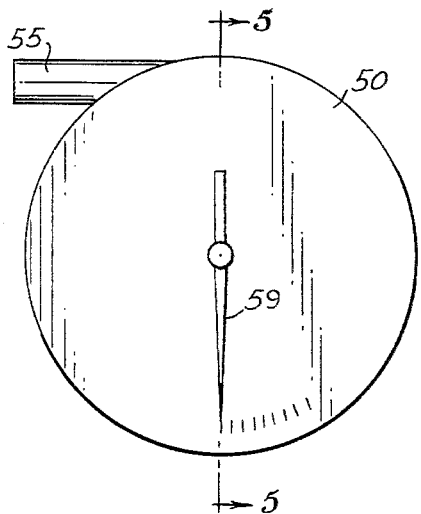
FIG. 4 is a front elevational view of another pressure-operated device which may be used with the method of the present invention.
Figure 5:
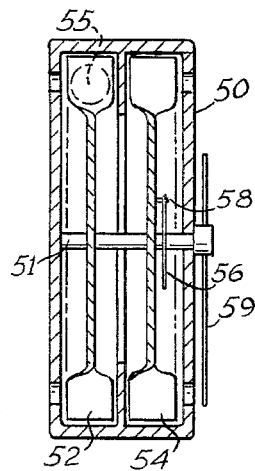
FIG. 5 is a cross sectional view taken substantially along line 5—5 of FIG. 4; and, FIG. 6 is a plot of data compiled from numerous determinations of liters of expired air versus caloric expenditure per minute.

The device shown in FIGS. 4 and 5 also operates on the relationship of pressure and volume. The device comprises a cylindrical housing 50 having a central axle 51 which carries a pair of turbine blades 52 and 54, the two turbine blades acting as a fluid coupling.

---

[1] Calorie-meter reading.

An inlet 55 directs the incoming air tangentially against the turbine 52 which spins freely on the axle 51. In accordance with well known principles, the turbine 52 will cause a torque on the turbine 54; however, the turbine 54 is restricted in its movement by a hairspring 56. The hairspring 56 is fixed to the housing 50 and to the lug 58 on turbine 54. It will thus be seen that the greater the angular velocity of turbine 52 and the greater the torque on turbine 54, the farther the turbine 54 will be rotated against the tension of the hairspring 56. A pointer 59 which moves with the turbine 54 will show the amount of rotation of the turbine 54, and may be calibrated to read the rate of calories expended in accordance with the above stated relationship.

All of the devices described above must be designed to handle various volumes of gas ranging from a minimum of gas which a person would exhale to a maximum a person would exhale under conditions of maximum activity. This range would be approximately from 5 liters per minute to 150 liters per minute.

The present invention has been described in detail above for purposes of illustration only and is not intended to be limited by this description or otherwise except as defined in the appended claims.

I claim:

1. A caloric consumption measuring device comprising means for receiving and determining the volume of the expired air of an individual, and means for indicating the caloric expenditure of said individual as a function of the volume of expired air received based on the relationship that one liter of expired air at standard conditions is substantially equal to the expenditure of .207 calorie.

2. A caloric consumption measuring device comprising means for receiving and determining the volume of the expired air of an individual per unit of time, and means for indicating the rate of caloric expenditure of said individual as a function of the volume of expired air received per unit of time based on the relationship that one liter of expired air at standard conditions is substantially equal to the expenditure of .207 calorie.

3. A calorie consumption measuring device comprising an inlet port of constant cross sectional area for receiving the respired air of an individual at body temperature, means for determining the volume of respired air introduced into said inlet port by measuring the flow rate of said respired air, an indicator that is activated by said flow rate responsive means to record the rate of an individual's caloric expenditure calibrated in keeping with the functional relationship that one liter of respired air at standard atmospheric conditions is substantially equal to the expenditure of .207 calorie.

4. A calorie consumption measuring device comprising an inlet port of constant cross sectional area for receiving the respired air of an individual at body temperature, means for determining the volume of respired air introduced into said inlet port, an indicator that is activated by said volumetric determining means to record an individual's caloric expenditure calibrated in keeping with the functional relationship that one liter of respired air at standard atmospheric conditions is substantially equal to the expenditure of .207 calorie.

5. A calorie consumption measuring device as defined in claim 4, including a timing means for recording the time interval during which the respired air is measured.

References Cited by the Examiner

UNITED STATES PATENTS

| | | | |
|---|---|---|---|
| 1,988,221 | 1/1935 | Soskin | 128—2.07 |
| 2,569,849 | 10/1951 | Emerson | 128—2.08 |
| 2,630,798 | 3/1953 | White | 128—2.07 |
| 2,633,843 | 4/1953 | Glasser | 128—2.07 |
| 2,916,033 | 12/1959 | Coleman | 128—2.07 |

RICHARD C. QUEISSER, *Primary Examiner.*

DAVID B. DEIOMA, JAMES J. GILL, J. FISHER,
*Assistant Examiners.*